United States Patent [19]

Pearce

[11] Patent Number: 5,361,240

[45] Date of Patent: Nov. 1, 1994

[54] ACOUSTIC SENSOR

[75] Inventor: Richard E. Pearce, Azle, Tex.

[73] Assignee: Innovative Transducers Inc., Halton City, Tex.

[21] Appl. No.: 550,520

[22] Filed: Jul. 10, 1990

[51] Int. Cl.⁵ .......................................... H04R 17/00
[52] U.S. Cl. .................................... 367/157; 367/159; 367/165; 367/167; 367/172; 310/337; 310/800
[58] Field of Search ............... 367/157, 159, 165, 167, 367/169, 172, 173; 310/337, 800

[56] References Cited

U.S. PATENT DOCUMENTS

| | | | |
|---|---|---|---|
| 2,762,032 | 9/1956 | Vogel | 367/140 |
| 3,798,474 | 3/1974 | Cassand et al. | 367/169 |
| 4,092,628 | 5/1978 | Hall, Jr. | 340/10 |
| 4,525,645 | 6/1985 | Shirley et al. | 310/337 |
| 4,653,036 | 3/1987 | Harris et al. | 367/170 |
| 4,789,971 | 12/1988 | Powers et al. | 367/152 |
| 4,805,157 | 2/1989 | Ricketts | 367/119 |
| 4,810,913 | 3/1989 | Beauducel et al. | 367/165 |

Primary Examiner—Deborah L. Kyle
Assistant Examiner—J. Woodrow Eldred
Attorney, Agent, or Firm—William A. Knox

[57] ABSTRACT

A pressure compensated hydrophone assembly consists of a hollow mandrel that has an outer surface. The central portion of the outer surface of the mandrel defines a concavity. A flexible, resilient piezoelectric film is wrapped several times around the mandrel. The volume between the inner wrap of the film and the concavity on the outer surface of the mandrel serves as a pressure compensation chamber. The hydrophone is responsive to varying hydrodynamic pressure fields but is substantially inert to acceleration forces, localized impacts and variations in hydrostatic pressure.

13 Claims, 2 Drawing Sheets

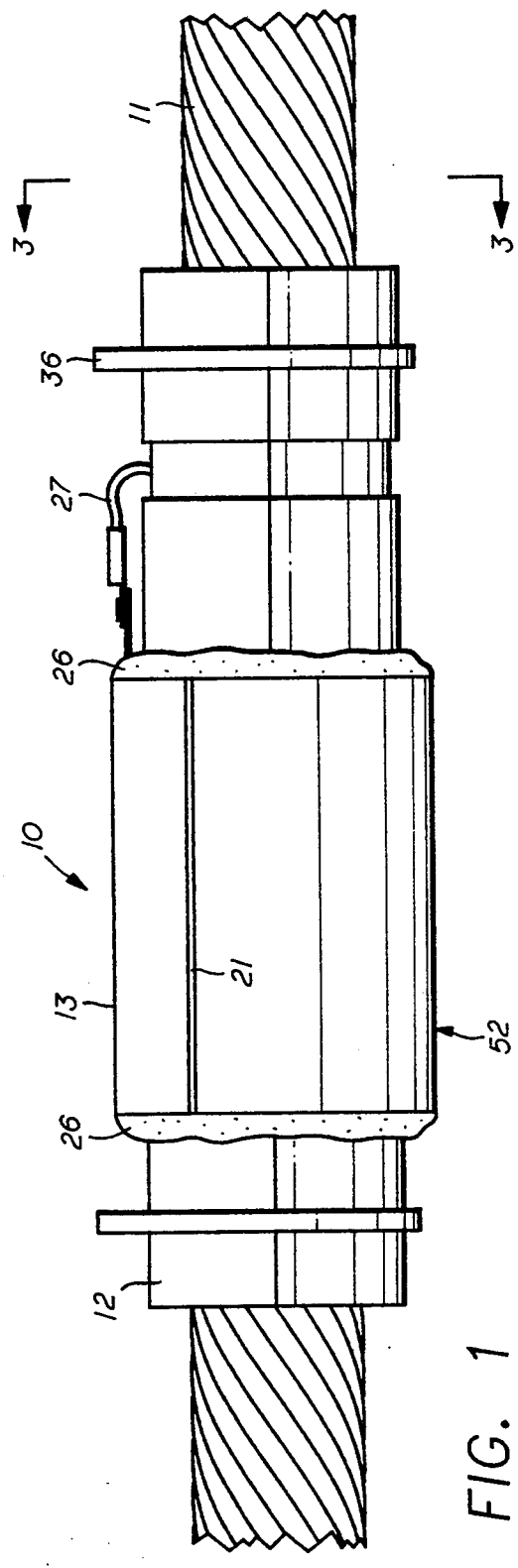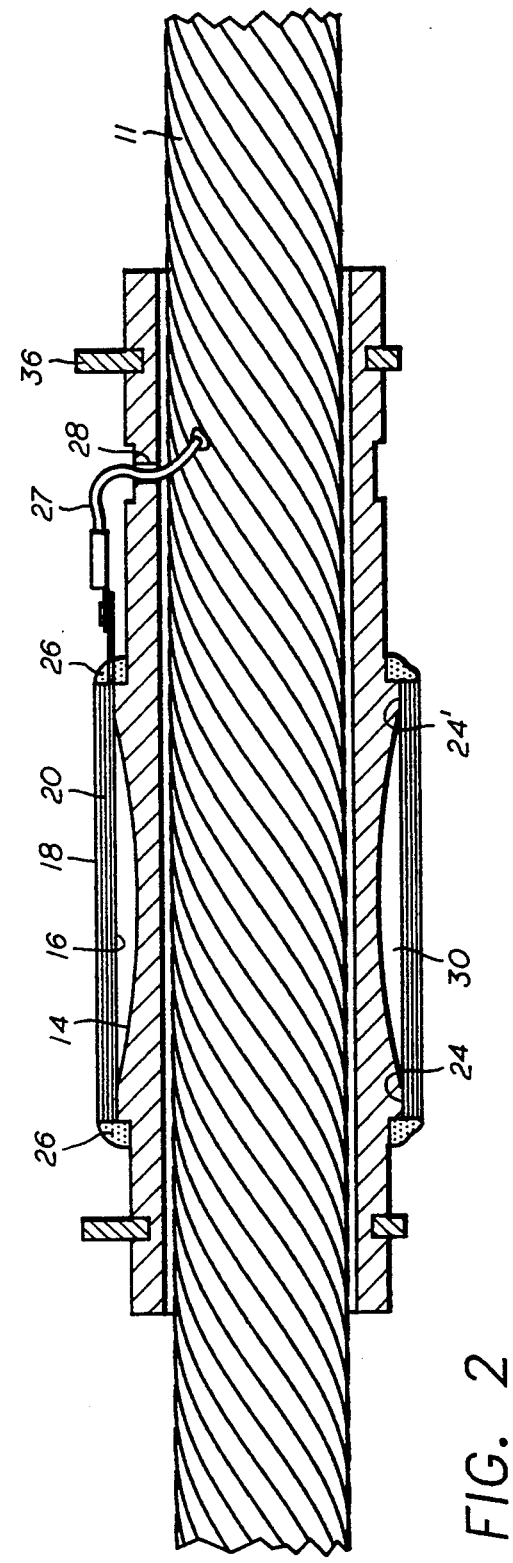

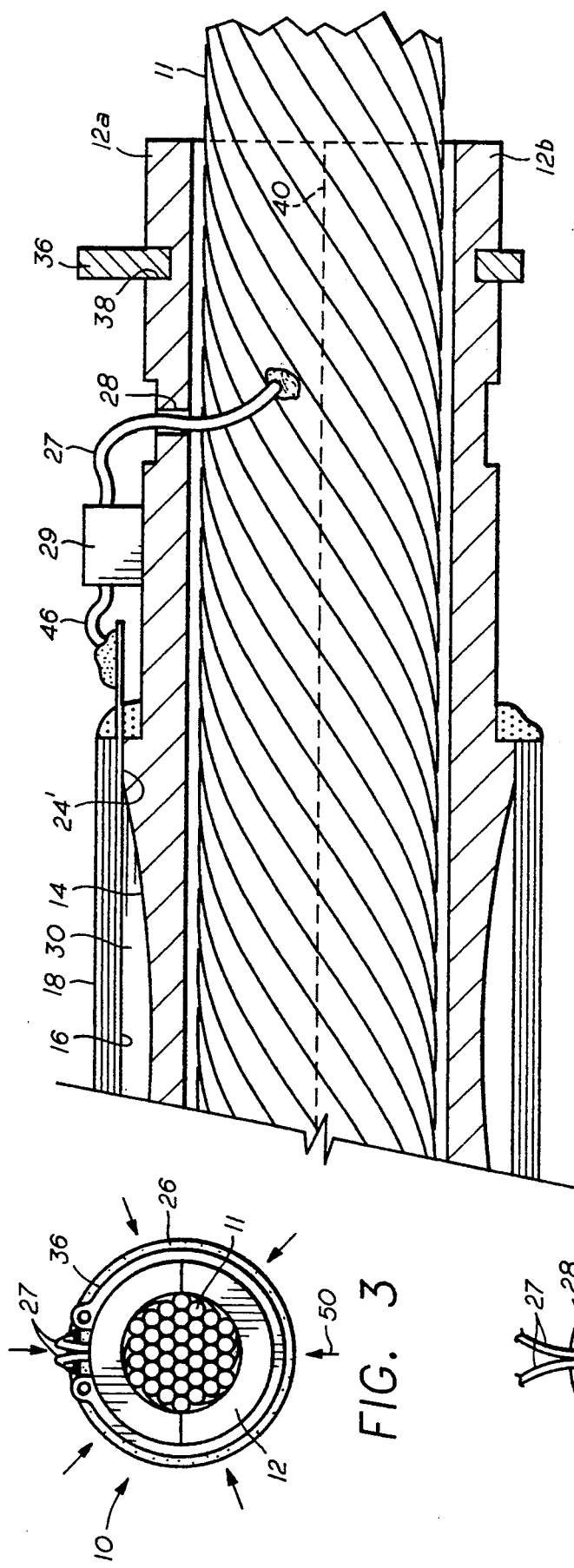
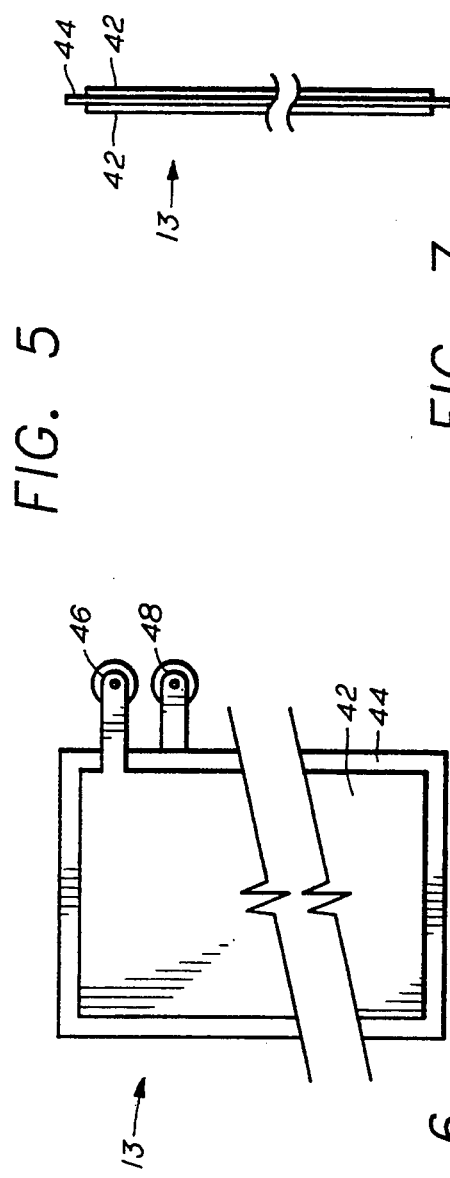
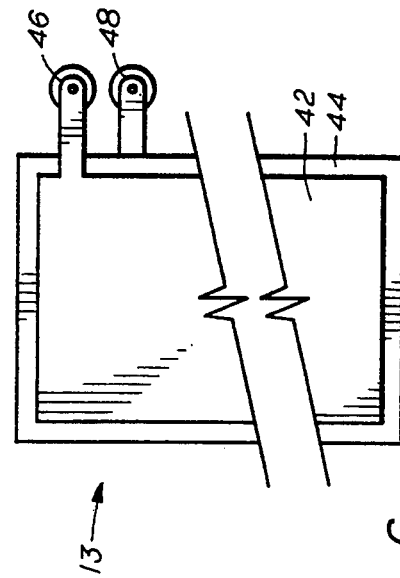
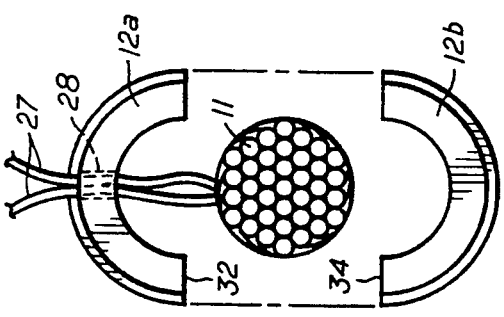
FIG. 3
FIG. 4
FIG. 5
FIG. 6
FIG. 7

ACOUSTIC SENSOR

BACKGROUND OF THE INVENTION

1. Field of the Invention

This invention relates to hydrophones for use under great hydrostatic pressures and under conditions of severe hydrodynamic stress.

2. Discussion of the Prior Art

Piezoelectric hydrophones of various configurations are well known for use in seismic exploration, for tracking submarines in the deep ocean, for vertical seismic surveys in bore holes and for many other uses. Variations in the acoustic pressure produce an electrical output from the hydrophones measured in microvolts to millivolts.

Typically, commercial piezoelectric hydrophones employ ceramic materials such as barium titanate or lead zirconate titanate. The active element of the hydrophone may take the form of a thin wafer that operates in the bender mode as exemplified by U.S. Pat. No. 4,092,628. Other units may be shaped as a right cylinder that operates in the radial mode such as shown by U.S. Pat. No. 4,525,645. The ceramic material is brittle. In the presence of a severe shock wave, such as from a nearby explosive charge or from a powerful air gun, the piezoelectric element shatters. Most hydrophones have a definite depth limit. An excessive overpressure causes the element to bend beyond its elastic limit, resulting in signal distortion and ultimate failure of the instrument. In the case of the wafer configuration, an internal stop may be provided to prevent excessive bending but the wafer tends to develop a permanent set that degrades the output signal.

Another class of material is polyvinylidene fluoride (PVDF), a piezoelectric polymer film, such as KYNAR Piezo film made by Pennwalt Corp. of Valley Forge, Pa. The film is useful as a hydrophone element because its acoustic impedance is close to that of water; acoustic wavefields do not suffer spurious reflections and diffractions as they do when encountering ceramic piezoelectric elements. The signal output is many times higher than the signal output of ceramic devices. Available in sheets of any size and a wide range in thickness, piezoelectric film may be readily shaped and cut to fit the intended use. Prior to use, the material is poled or activated in the thickness direction by application of a high electric field at an elevated temperature for a requisite period of time. Conductive-metal electrodes are evaporated on the opposite sides of the film as with ceramic materials.

An external mechanical force applied to the film results in a compressive or tensile strain. The film develops a proportionate open circuit voltage, that is, an electrical charge proportional to changes in mechanical stress or strain. The charge developed diminishes with time, depending on the dielectric constant of the film and the impedance of the connected circuitry. By convention, the polarization axis is the thickness axis. Tensile stress may take place along either the longitudinal axis or the width axis.

One type of transducer, disclosed in U.S. Pat. No. 4,653,036, employs a PVDF membrane stretched over a hoop ring. A metallic backing is attached to the back of the hoop ring and the void between the film and the backing is filled with an elastomer such as silicone. The device appears to operate in the bender mode. U.S. Pat. No. 4,789,971 teaches use of a voided slab of PVDF material sandwiched between a pair of copper electrodes. A bilaminar construction is also disclosed. A preamplifier is included in the assembly. The transducer operates in the thickness-compressive mode.

A hydrophone array shown in U.S. Pat. No. 4,805,157 consists of multiple layers of PVDF material symmetrically disposed around a stiffener for prevention of flexural stresses. The axis of maximum sensitivity is in the direction transverse to the plane of the layers. It is therefore sensitive to compressive stresses.

In this disclosure, the term "hydrostatic pressure" refers to the static pressure due to a column of water at some particular depth. The term "hydrodynamic pressure" refers to the dynamic pressure differences that are created by acoustic wave fields propagating through the water at a particular depth. In effect, the hydrostatic pressure is the average pressure base line about which the hydrodynamic pressure variations fluctuate.

SUMMARY OF THE INVENTION

It is an object of this invention to provide a rugged hydrophone assembly or sensor that will withstand severe shock waves without damage and one that may be deployed to great depths without signal degradation.

In an aspect of this invention, I wrap a flexible piezoelectric element a plurality of times around a hollow mandrel having an outer surface. An insulating material is applied between each of the wraps. I provide a predetermined volume of gas, preferably inert, in a gas chamber that is formed between the innermost wrap of the piezoelectric element and the outer surface of the mandrel. The volume of gas provides means for compensating for changes in hydrostatic pressure. Taken in cross section, the boundaries of the gas chamber define a meniscus. The volume of gas may be adjusted to optimize the electrical output of the hydrophone at a predetermined range of working depths. The piezoelectric element is electrically responsive to tensile stress due to applied radial hydrodynamic pressure transients. The hydrophone assembly is encapsulated with a potting compound.

In an aspect of this invention, The hydrophone assembly includes a hollow mandrel that has a length equal to a multiple of its diameter. The mandrel has an outer surface, the central portion of which defines a concavity and has an end shoulder on each end thereof. A flexible piezoelectric element, including inactive edge portions that are spaced apart by the length of the mandrel, is wrapped a plurality of times around the mandrel. The inactive edge portions of the piezoelectric element are hermetically sealed to the end shoulders of the mandrel. An air chamber is defined between the central portion of the outer surface of the mandrel and the innermost wrap of the piezoelectric element. The hydrophone assembly is electrically responsive to tensile stresses due to uniformly-applied radial hydrodynamic pressure transients but is electrically inert to acceleration forces, localized mechanical forces and changes in hydrostatic pressure.

In another aspect of this invention, the hollow mandrel includes two segmented portions that are hermetically sealed together after assembly.

BRIEF DESCRIPTION OF THE DRAWINGS

These and other benefits and advantages of my invention will be better understood by reference to the detailed description and the drawings wherein:

FIG. 1 is an overall external view of the hydrophone of this invention;

FIG. 2 is a cross section of FIG. 1;

FIG. 3 is an end view of FIG. 1 as seen from line 3—3';

FIG. 4 shows the mandrel in a segmented configuration;

FIG. 5 is an expanded view of one end of the mandrel taken in cross section;

FIG. 6 is the preferred configuration of a piezoelectric film element before it is wrapped around the mandrel; and FIG. 7 is an exaggerated schematic cross section of the piezoelectric film.

DETAILED DESCRIPTION OF THE PREFERRED EMBODIMENT

Considering now, FIGS. 1 and 2, FIG. 1 is an external view of the hydrophone 10 of this invention encircling a cable 11 which may be a seismic cable of any desired type. The cable includes a stress member (not shown) and a plurality of electrical conductors for transmitting signals from hydrophone 10 (and from other hydrophones that may be mounted along the same cable) to a signal receiving device. FIG. 2 is a cross section of FIG. 1.

Hydrophone 10 consists of a hollow mandrel 12 having an outer surface 14, the central portion of which defines a concavity that is preferably shaped as a parabola but may be of any other shape if desired. Any convenient rigid material may be used for the mandrel including but not limited to brass, steel, titanium, rigid plastic or non-piezoelectric ceramic. The length of the mandrel is a multiple of the diameter. The mandrel may be of any length that is suitable for the application.

A flexible, resilient piezoelectric element having inactive end portions (to be described infra), generally shown in FIG. 1 as 13, is wrapped a plurality of times around the mandrel. There is an inner wrap 16 (FIG. 2), an outer wrap 18 and there may be one or more intermediate wraps 20. The outer wrap necessarily has an exposed end portion 21 that is hermetically sealed to the underlying wrap by a sealing compound. On opposite ends of the concavity, the mandrel is provided with square end shoulders 24 and 24'. The inactive edge portions of the resilient piezoelectric element are hermetically sealed to shoulder 24 and 24' by a potting compound 26 such as polyurethane. In fact, if desired, the potting compound may be injection-molded over the entire unit. The hardness of the potting compound may range up to a value of 90 as measured by a Shor durometer. Electrical leads such as 27 electrically couple the piezoelectric element to conductors in cable 11 via a portal 28 in one end of mandrel 12. A gas chamber 30 is defined between the outer surface 14 of mandrel 12 and inner wrap 16 of the resilient piezoelectric element. The volume depends upon the depth and length of the concavity defined by the central portion of the outer surface of the mandrel 12. The contained gas may be nitrogen or it may simply be air. The gas chamber is hermetically sealed as above described and thus provides means for hydrostatic pressure compensation. The boundaries of the chamber, as seen in cross section as in FIG. 2, define a meniscus. With no externally-applied hydrostatic pressure, the upper boundary of the meniscus as defined by the inner wrap 16 is a curve having an infinite radius. If desired, a signal conditioning unit such as a preamplifier 29 (FIG. 5) may be integrated with the hydrophone assembly.

I have thus disclosed a pressure-compensated hydrophone assembly having an air-backed flexible piezoelectric element that is hermetically sealed externally around a hollow mandrel.

FIG. 3 is an end view along section 3—3' of the hydrophone 10.

Mandrel 12 may be a relatively tight fit with respect to cable 11. That is, if the hydrophone is fully assembled beforehand, it is difficult to slide it along the cable 11 to its proper position. Therefore, in FIG. 4, the mandrel preferably is segmented in two portions 12a and 12b. They are placed in position around the cable and the mating faces 32 and 34 are hermetically sealed together by a suitable cement such as epoxy. Referring back to FIG. 3, a snap ring such as 36 holds the segmented portions together while the cement sets. The piezoelectric element 13 is then wrapped around the assembled mandrel and sealed in place. During assembly of the mandrel 12 around cable 11, it is convenient to first connect electrical leads 27 to conductors in cable 11 and to thread them through portal 28 for later electrical coupling to element 13 after assembly of the segmented portions.

FIG. 5 is an enlarged cross section of one end of mandrel 12 showing the outline of the concavity around the central portion of the outer surface 14 and square end shoulder 24'. Portal 28 is provided for receiving electrical leads 27 therethrough from piezoelectric element 13 and signal conditioner 29 for connection to appropriate conductors in cable 11. A slot 38 receives snap ring 36. Junction line 40 between the two segmented portions 12a and 12b of the mandrel is hermetically sealed as mentioned earlier.

I prefer to use poled polyvinylidine flouride (PVDF) as the flexible, resilient piezoelectric element. FIG. 6 illustrates a sheet of PVDF that has a width equal to the length of the mandrel 12 between the outside edge of square end shoulders 24 and 24'. The length is sufficient to allow the sheet to be wrapped around the mandrel three or four or more times. Preferably, the film thickness is on the order of 28 μm although other thicknesses may be used. A metallized electrode area 42 is evaporated over most of the film on both sides but leaving an inert, inactive border or edge portions 44 around the sheet. Evaporated silver or silver ink are the most common electrode compositions although other metals, such as gold, may be used. Metallic leads 46 and 48 deliver electrical signals to signal conditioner 29 of FIG. 5. FIG. 7 is a cross section of the film, showing the electrode areas 40. The figure is grossly exaggerated because in reality, the electrode material is only a few molecules thick. Upon request, the manufacturer provides a thin insulating coating over the electrode areas to electrically insulate the wraps, one from the other. Alternatively, I could apply a thin layer of nonconductive epoxy between wraps to provide electrical insulation.

In operation, uniformly-distributed radial acoustic hydrodynamic transient pressure fields, as represented by the inwardly-directed arrows such as 50 of FIG. 3, exert tensile stresses along the longitudinal and lateral axes of piezoelectric element 13, generating a voltage output in response to pressure variations. Compensation for changes in hydrostatic pressure is provided by the volume of gas in chamber 30. As the external hydrostatic pressure increases or decreases, inward contraction or outward expansion of the flexible, resilient piezoelectric element creates corresponding changes in the pressure of the gas in chamber 30, thus equalizing the internal and external pressures. Regardless of the applied external pressure, the inner wrap 16 of piezoelectric element 13 will not bottom-out. Because the chamber 30 is hermetically sealed and because the PVDF film is substantially impervious to migration of gas molecules, a gas cushion will always be present. In effect, there is no upper external pressure or depth limit for the hydrophone, provided, of course, that the mandrel 12 does not collapse, which it will not do if properly designed. The hydrophone assembly 10 may be configured for optimum electrical output at a desired range of operating depths by adjusting the volumetric capacity of the gas chamber; a larger volume provides for a wider operating range.

By reason of its construction, the hydrophone is inherently insensitive to acceleration forces. A random localized impact, such as might be applied by a sharp object, symbolized by arrow 52 in FIG. 1, striking the hydrophone will generate a small signal but the resulting electrical charge will be dissipated over the entire area of piezoelectric element 13 and become so attenuated as to be virtually undetectable. The hydrophone is therefore substantially electrically inert to localized mechanical forces. Because of the pressure equalization provided by the gas chamber, the piezoelectric element is not sensitive to hydrostatic pressure variations.

Those skilled in the art will doubtless contemplate variations in the design and construction of this invention but which will fall within the scope and spirit of this disclosure which is limited only by the appended claims.

I claim as my invention:

1. A hydrophone assembly, comprising:
    a hollow mandrel having a concave outer surface;
    a flexible piezoelectric element, including inactive opposite edge portions wrapped a plurality of times in successive superimposed wraps around the outer surface of said mandrel, there being at least an inner wrap and an outer wrap;
    means for insulating each wrap one from the other; and
    means for hermetically sealing the inactive edge portions of said piezoelectric element to the outer surface of said mandrel.

2. The hydrophone assembly as defined by claim 1, wherein:
    said flexible piezoelectric element is electrically responsive to tensile stress due to uniformly applied external radial hydrodynamic pressure transients.

3. The hydrophone assembly as defined by claim 1, comprising:
    means for compensating for hydrostatic pressure changes.

4. The hydrophone assembly as defined by claim 1, comprising;
    a predetermined volume of gas encapsulated in a gas chamber formed between the concave outer surface of said mandrel and the inner wrap of said flexible piezoelectric element for compensating for variations in hydrostatic pressure and for forming a cushion to prevent said flexible piezoelectric element from bottoming out against the outer surface of said mandrel.

5. The hydrophone assembly as defined by claim 4, wherein:
    the boundaries of said chamber as defined by the outer surface of said mandrel and said inner wrap of said flexible piezoelectric element taken in cross section, define a meniscus.

6. The hydrophone assembly as defined by claim 4, comprising:
    means for configuring said assembly for optimum electrical output at a predetermined range of working depths by adjusting the volumetric capacity of said gas chamber.

7. The hydrophone assembly as defined by claim 6, comprising
    electrical signal output leads terminating said outer wrap; and
    signal conditioning means, electrically interconnected with said flexible piezoelectric element by said output leads, integrated with said hydrophone assembly.

8. A pressure compensated hydrophone assembly, comprising:
    a hollow mandrel having an outer surface and a length equal to a predetermined multiple of its diameter, the central portion of said outer surface defining a concavity;
    a flexible piezoelectric element having inactive edge portions that are laterally spaced apart by an amount equal to the length of said mandrel, wrapped a plurality of times around said mandrel, there being an inner wrap, intermediate wraps and outer wrap having an exposed end portion, said flexible piezoelectric element being electrically responsive to tensile stresses due to uniformly distributed transient acoustic wavefields applied radially thereto;
    an insulating film separating each said wrap; and
    a volume of air enclosed between the outer surface of said mandrel and said inner wrap.

9. The hydrophone as defined by claim 8, comprising:
    a square end shoulder on each end of said mandrel;
    means for hermetically sealing the inactive edge portions of said piezoelectric element to said square end shoulders; and
    means for hermetically sealing said exposed end portion to an underlying wrap.

10. The hydrophone as defined by claim 9, wherein:
    said hollow mandrel consists of two segmented portions that may be hermetically sealed together.

11. The hydrophone assembly as defined by claim 10, comprising: electrical output leads terminating said outer wrap.

12. A pressure compensated hydrophone assembly, comprising:
    a hollow mandrel;
    an air-backed multilayered flexible piezoelectric element hermetically sealed externally around said hollow mandrel, said resilient piezoeleotric element producing electrical output signals in response to tensile stresses due to uniformly-applied hydrodynamic pressure transients, said flexible piezoelectric element further being substantially electrically inert to acceleration forces, to localized mechanical forces and to variations in hydrostatic pressure.

13. The pressure compensated hydrophone assembly as defined by claim 12, wherein:
    said flexible piezoelectric element is a polyvinylidene fluoride film including conductive electrodes on opposite sides thereof.

* * * * *